Oct. 30, 1956     H. A. MITCHELL ET AL     2,768,848
COUPLING BALL AND METHOD OF PRODUCTION
Filed Jan. 9, 1953
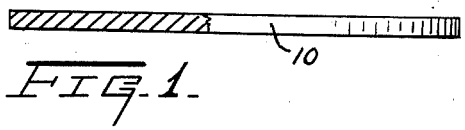
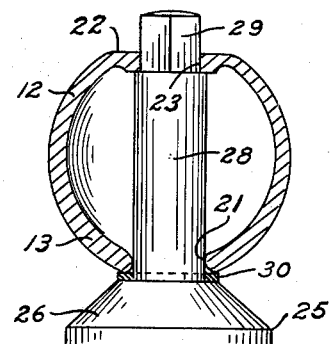
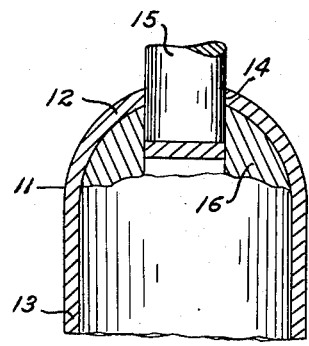
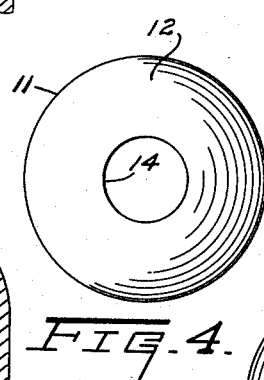
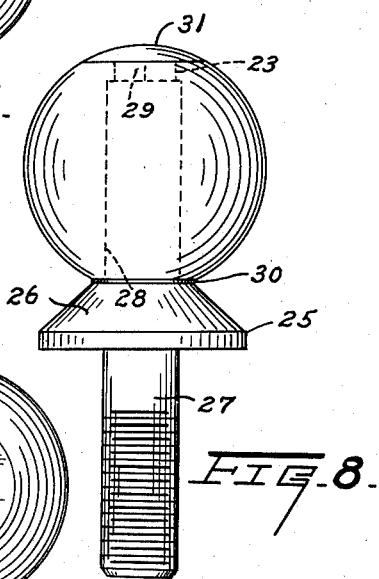
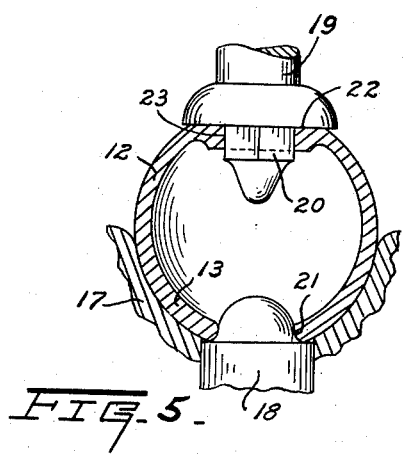
INVENTORS
H. A. Mitchell
BY H. C. Riemann
Lieber & Lieber
ATTORNEYS

United States Patent Office 2,768,848
Patented Oct. 30, 1956

2,768,848

COUPLING BALL AND METHOD OF PRODUCTION

Harry A. Mitchell, Mukwonago, and Howard C. Riemann, West Allis, Wis., assignors to The Fulton Company, West Allis, Wis., a corporation of Wisconsin Application January 9, 1953, Serial No. 330,476

4 Claims. (Cl. 287—87)

The present invention relates generally to improvements in the art of manufacturing universal couplings, and relates more specifically to improvements in the construction of sheet metal ball coupling assemblages and to an improved method of producing such assemblages.

It is common practice to connect draft and trailer vehicles by means of universal couplings each comprising a ball assemblage secured to one of the vehicles and a socket assemblage coacting with the ball and being secured to the other of the two vehicles. These couplings must be sturdily constructed and the ball and socket elements must also be accurately formed so as to permit free relative universal movement thereof, and while most of these elements of the prior universal trailer couplings are formed of castings some have heretofore been constructed of sheet metal with the aid of punches and dies. The prior cast metal ball and socket couplings not only subjected the manufacturers to considerable liability due to breakage of parts and resultant accidents caused by hidden defects in the castings, but also required costly machining in order to produce accurate coaction and free movement between the ball and socket. The previous sheet metal ball and socket couplings were entirely satisfactory so far as the socket assemblages were concerned, but were difficult to produce and lacked sufficient strength and accuracy with respect to their ball assemblages.

Our present invention is therefore directed to improvements in the production of sheet metal ball assemblages for vehicle trailer couplings of the above mentioned type, whereby all former objections have been eliminated.

The primary object of the present invention is to provide an improved method of producing sturdy and accurately formed sheet metal coupling ball assemblages from a few durable parts, and with the aid of simple punches and dies.

Another important object of the invention is to provide a simplified, more durable and accurately constructed sheet metal universal coupling ball assemblage, than has heretofore been produced.

A further important object of this invention is to provide a precision built trailer coupling ball assembly in which the ball is formed of a single sheet of metal and is rigidly attached to a single forged mounting stem in a manner whereby an exceptionally strong and relatively inexpensive but efficient two piece coupling member results.

Still another object of our invention is to provide an improved mode of expeditiously forming cold pressed sheet metal balls from flat metal blanks so that successive spheres are precisely alike.

These and other objects of the present invention will be apparent from the following detailed description.

A clear conception of the several steps involved in the present improved production method, and of the construction of one of the improved articles resulting from commercial exploitation of the method, may be had by referring to the drawing accompanying and forming a part of this specification wherein like reference characters designate the same or similar parts in the various views.

Fig. 1 is a part sectional side view of one of the flat circular sheet metal blanks used to form the ball or sphere of the assemblage;

Fig. 2 is a central section through the cup produced by the first deformation of the blank shown in Fig. 1;

Fig. 3 is a similar section through the cup, depicting the second step of punching a round hole through the center of the cup dome, also showing fragments of the punch and die;

Fig. 4 is a top view of the cup after the hole has been punched therein, as in Fig. 3;

Fig. 5 is a central section through the further deformed sheet metal blank, illustrating the manner in which it is pressed into truly spherical shape, and also showing a fragment of the pressing punch in section and several forming dies in elevation;

Fig. 6 is a top view of the sheet metal ball or sphere resulting from the deformation of the blank, as in Fig. 5;

Fig. 7 is another central section through the completed sheet metal ball showing the same initially applied to a unitary forged mounting element or stem; and Fig. 8 is a side elevation of the finally completed ball and stem assemblage.

While the invention has been illustrated and described herein as being especially adapted for the production of vehicle trailer coupling assemblages, it is not the intent to unnecessarily restrict the invention by virtue of this limited adaptation; and it is also contemplated that specific descriptive terms used herein be given the broadest possible interpretation consistent with the disclosure.

Referring to the drawing, in accordance with the present invention, a substantially circular flat sheet metal blank 10 of proper diameter and thickness, such as shown in Fig. 1, is first provided. This blank 10 is then drawn with the aid of suitable dies and in a well known manner, into unitary cup shape 11 having a semi-spherical dome 12 and an integral continuous cylindrical brim 13, the generating radii of both of which are precisely equal to that of the final sphere or ball which it is desired to produce, as illustrated in Fig. 2. After the blank 10 has been drawn to cup shape as in Fig. 2, its thickness will be slightly reduced and the edge of the brim 13 may be somewhat irregular as shown. An approximately circular hole 14 may thereafter be formed in the center of the dome 12 with the aid of a punch 15 and a die 16 as depicted in Figs. 3 and 4.

The resultant cup with the central hole 14 punched in its dome 12 is subsequently subjected along its brim 13 to a semi-spherical pressure plunger or punch 17 having a central circular pilot die or pin 18 in its semi-spherical bottom, while the portion of the dome 12 surrounding the hole 14 is caused to coact with the flat surface formed on a stationary reaction die 19 having an integral polygonal pilot projection 20 extending centrally within the hole 14, as shown in Fig. 5. When pressure is applied to the punch 17 and while the die 19 is fixed, the brim 13 of the cup is distorted into complementary semi-spherical shape to complete the ball and to eventually form a round opening 21 as the contracted cup brim 13 engages the pilot pin 18. While the brim 13 is thus being pressed into semi-spherical shape it is also thickened toward the opening 21; and simultaneously with this ball forming operation, the die 19 and projection 20 coact with the dome 12 to form a flat external surface 22 on the sphere around the round hole 14 and to distort the latter into polygonal or hexagonal shape 23, as illustrated in Fig. 6.

A forged steel unitary mounting stem 25 having a medial integral off-set or flange 26, a screw threaded shank 27 on one side of the flange, and a cylindrical portion 28 provided with a polygonal end portion 29 on the other side of the flange 26, should then be applied to each of the sheet-metal balls, as depicted in Fig. 7. If so desired, a resilient washer 30 may also be applied to the stem portion 28 between the flange 26 and the ball, and the adjacent end of the portion 28 may rather loosely fit the opening 21 while the opposite polygonal end portion 29 should rather snugly fit the polygonal hole 23 and should project outwardly beyond the surface 22 a considerable distance. After the ball and stem have been initially assembled as in Fig. 7, the protruding end portion 29 of the stem may be riveted or pressed and distorted into spherical zone contour 31, while being spread over and into intimate contact with the flat ball surface 22, as shown in Fig. 8, thereby completing the coupling ball assemblage. If a washer 30 has been applied to the stem 25, it will be pressed into intimate engagement with the flange 26 and ball opening 21 so as to seal the interior of the ball and to thereby prevent coating material from entering the hollow ball if the assemblage is subsequently plated or otherwise coated.

When the coupling ball assemblage has been thus completed the unitary ball will be rigidly attached to the unitary stem 25 to provide an exceptionally durable and accurately formed two piece structure. The various forming operations may be performed while the metal is cold and in rapid succession, and the threaded shank 27 may be firmly secured to a vehicle with the aid of a clamping nut and lock washer, while the sphere may be caused to cooperate with a coupling socket assemblage to provide a sturdy universal trailer coupling in which the coacting assemblages are relatively universally movable, in a well known manner. By pressing the ball into spherical shape from a unitary sheet metal blank 10, and by forging the one-piece stem, danger of having flaws introduced in the final assemblage is reduced to a minimum, and no machining operation other than cutting the screw threads on the stem shank 27 is required in order to produce precision built and identical successive assemblages. While the forming punches and dies have been shown rather schematically herein, the use of a circular pilot pin 18 and of a polygonal pilot projection 20 on the reaction die 19 is desirable as it greatly facilitates accurate formation and location of the alined apertures in the hollow ball.

With the present improved method of producing the trailer coupling assemblages, each one-piece ball is devoid of slits or cracks extending inwardly from the opening 21 and hole 23, and the sheet metal is considerably thickened and reinforced around the opening 21 while the round hole 14 is pressed into hexagonal or otherwise polygonal shape during the final ball forming operation. The polygonal shape of the hole 23 is desirable in order to prevent subsequent turning of the hollow sphere about the stem 25, and the use of the sealing washer 30 is unnecessary if the final assemblages are not to be plated or coated and are formed of rust resistant metal. The invention has gone into highly satisfactory and successful use, and the improved method may obviously be advantageously utilized to manufacture durable ball and stem assemblages of various sizes and at moderate cost.

It should be understood that it is not desired to limit this invention to the exact steps of the method or to the precise details of construction of the assemblage herein shown and described, for various modifications within the scope of the appended claims may occur to persons skilled in the art.

We claim:

1. The method of producing a coupling ball assemblage, which comprises, deforming a sheet-metal blank into cup shape having a dome bounded by an outer semi-spherical surface and an integral continuous annular brim bounded by an approximately cylindrical external surface, punching a hole centrally through the cup dome, pressing the cup brim inwardly to gradually thicken the same toward its free edge while causing said edge to terminate in an opening in axial alinement with said hole and also producing a complementary semi-spherical outer bounding surface on said brim and simultaneously flattening the metal of the dome adjoining said hole to provide a continuous inwardly directed flange, inserting a mounting stem having a rigid medial flange and a reduced end through the hollow sheet metal sphere resulting from said deforming and pressing operations with said stem flange coacting with said cup brim at said opening and said stem end projecting outwardly beyond said hole, and finally spreading said stem end into spherical zone formation over said dome flange while simultaneously forcing the sphere against said stem flange.

2. The method of producing a coupling ball assemblage, which comprises, deforming a flat sheet-metal blank of uniform thickness into cup shape having a dome bounded by an outer semi-spherical surface and an integral continuous annular brim bounded by an approximately cylindrical external surface, punching a hole centrally through the cup dome, pressing the cup brim inwardly to gradually thicken the same toward its free edge while causing said edge to terminate in an opening in axial alinement with said hole and also producing a complementary semi-spherical outer bounding surface on said brim and simultaneously flattening the metal of the dome adjoining said hole and deforming the latter into polygonal shape to provide a continuous inwardly directed flange, inserting a mounting stem having a rigid medial flange and a reduced similarly polygonal end through the hollow sheet metal sphere resulting from said initial deforming and pressing operations with said stem flange coacting with said cup brim at said opening and said stem end snugly fitting and projecting outwardly beyond said hole, and finally spreading said stem end into spherical zone formation over said dome flange while simultaneously forcing the sphere against said stem flange.

3. A coupling ball assemblage comprising, a unitary hollow sheet-metal ball having a hole at one end bounded by an inwardly directed continuous flange and being provided at its opposite end with an opening disposed coaxially with said hole and surrounded by a bounding portion of greater thickness than that of the ball adjoining said flange, and a mounting stem for said ball having a medial rigid outwardly directed flange coacting with said thickened ball portion and also having a ball penetrating end portion extending away from said flange through said opening and said hole and provided at its end remote from said outwardly directed flange with an integral ledge bounded by a spherical zone surface and spreading into snug clamping engagement with the exterior of said inwardly directed flange to clamp the ball against the outwardly directed flange.

4. A coupling ball assemblage comprising, a unitary hollow sheet-metal ball having a polygonal hole at one end bounded by an inwardly directed continuous flange and being provided at its opposite end with an opening disposed coaxially with said hole and surrounded by a bounding portion of greater thickness than that of the ball adjoining said flange, and a mounting stem for said ball having a medial rigid outwardly directed flange coacting with said thickened ball portion and also having a ball penetrating end portion extending away from said flange through said opening and said hole and provided at its end remote from said outwardly directed flange with a polygonal part fitting said hole and with an integral ledge bounded by a spherical zone surface and spreading into snug clamping engagement with the exterior of said inwardly directed flange to clamp the ball against the outwardly directed flange.

References Cited in the file of this patent

UNITED STATES PATENTS

| | | |
|---|---|---|
| 1,511,822 | Belcher | Oct. 14, 1924 |
| 1,814,703 | Johnson | July 14, 1931 |
| 1,881,877 | Nickelsen | Oct. 11, 1932 |
| 2,129,257 | Bachmann | Sept. 6, 1938 |
| 2,170,980 | Thorp et al. | Aug. 29, 1939 |
| 2,392,063 | Reimann et al. | Jan. 1, 1946 |
| 2,545,406 | Friend | Mar. 13, 1951 |